Dec. 30, 1947.                G. NEWTON                 2,433,389
REMOTE CONTROL SYSTEM FOR STEP-BY-STEP ADJUSTMENT OF VARIABLE IMPEDANCES
              Filed Sept. 17, 1942           6 Sheets-Sheet 1

INVENTOR:
G. NEWTON
BY
ATTORNEY

Dec. 30, 1947.  G. NEWTON  2,433,389
REMOTE CONTROL SYSTEM FOR STEP-BY-STEP ADJUSTMENT OF VARIABLE IMPEDANCES
Filed Sept. 17, 1942  6 Sheets-Sheet 3

INVENTOR
G. NEWTON
BY
J.L.Fearing
ATTORNEY

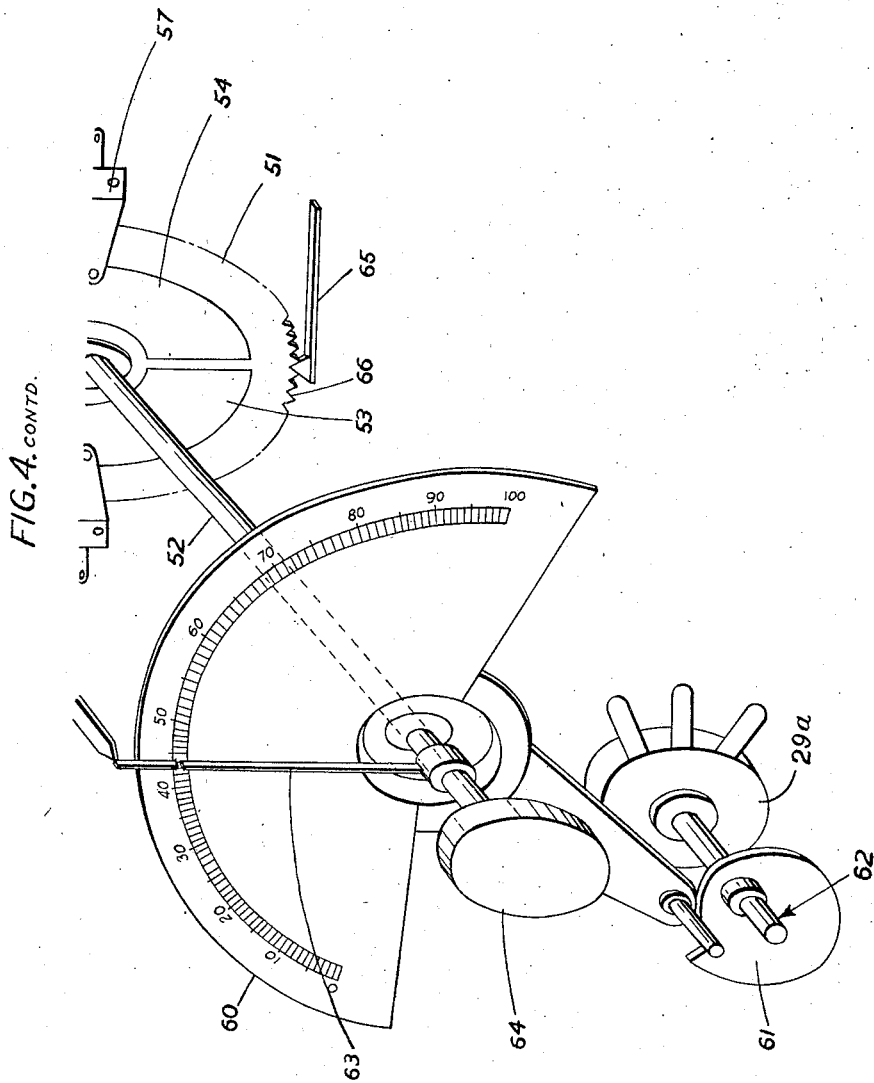

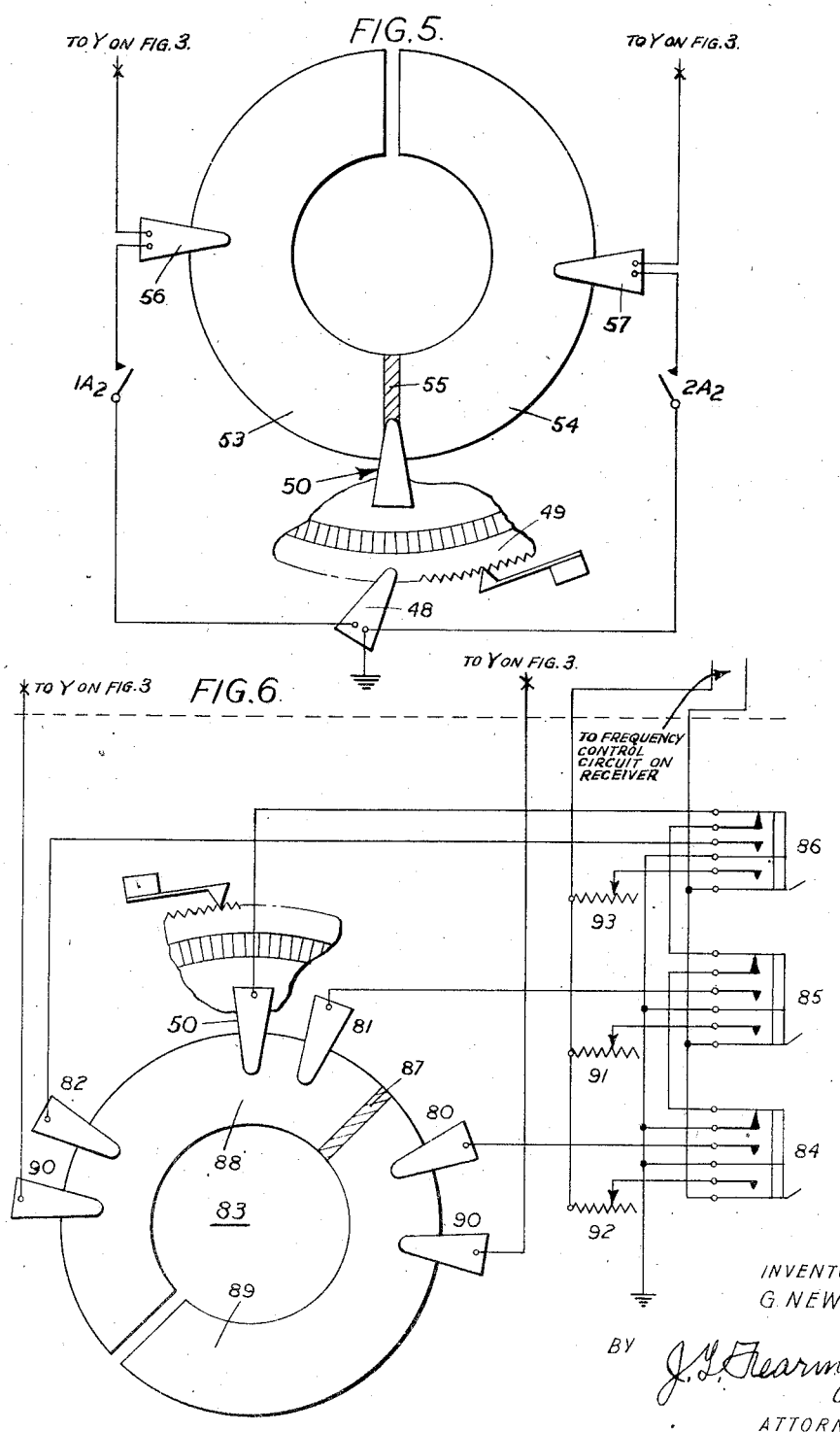

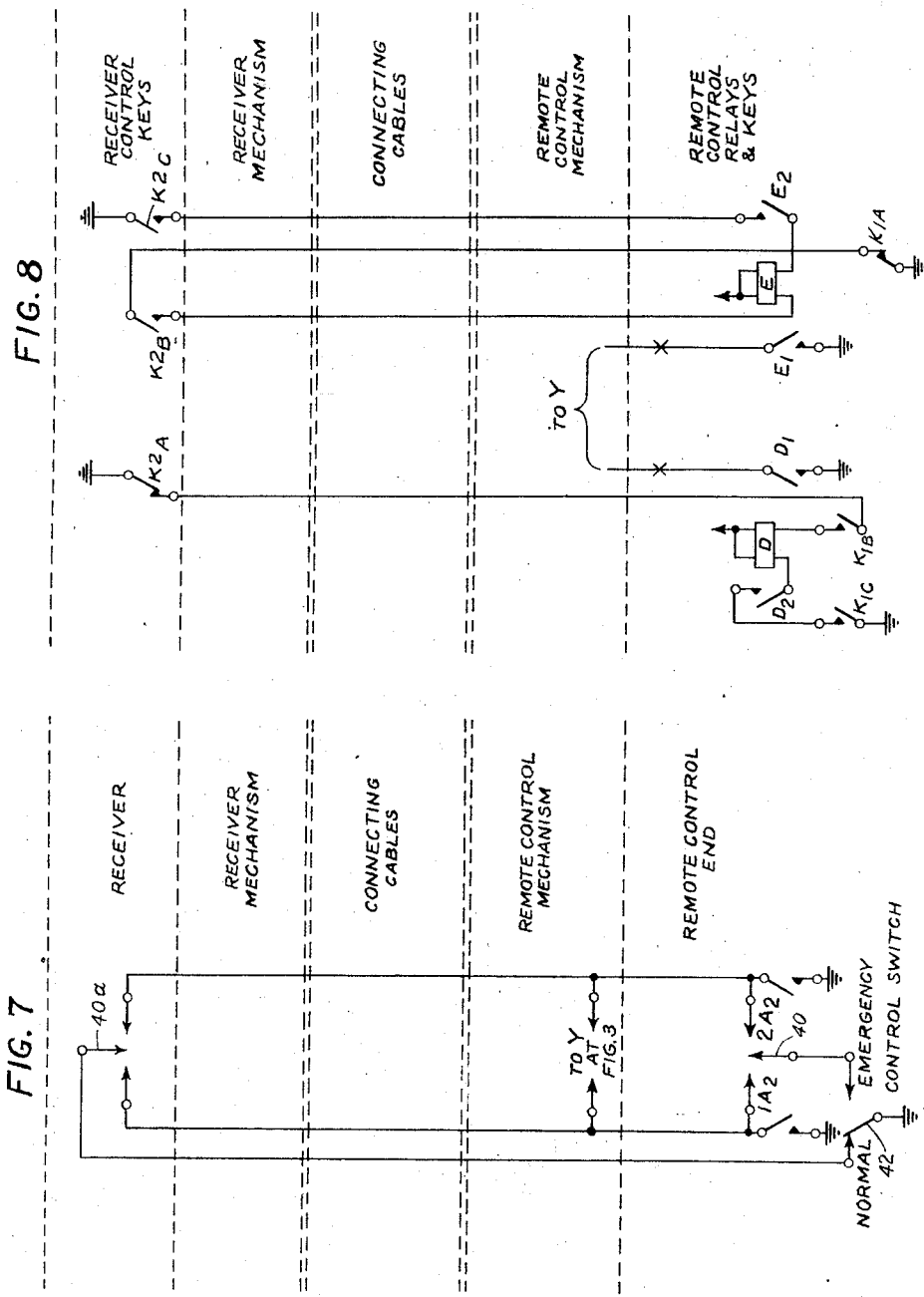

Patented Dec. 30, 1947

2,433,389

UNITED STATES PATENT OFFICE 2,433,389

REMOTE CONTROL SYSTEM FOR STEP-BY-STEP ADJUSTMENT OF VARIABLE IMPEDANCES

Geoffrey Newton, London W. C. 2, England, assignor to International Standard Electric Corporation, New York, N. Y.

Application September 17, 1942, Serial No. 458,742
In Great Britain September 30, 1941

6 Claims. (Cl. 250—40)

The remote control of tuning of radio receivers involves very high precision in the setting of the gang condenser and the remote indicating pointer. Most mechanical methods utilising flexible cables suffer from a lack of control due to backlash in the cable or associated gearing, while automatic electrical tuning is only applicable to very small changes in frequency and could not be used to control the receiver tuning throughout anything like its full range. Also, mechanical control systems are difficult to install as the permissible number of bends in the cable is strictly limited and curves of generous radius have to be allowed for, greatly increasing the difficulty of installation.

This invention relates to a system of control in which the tuning element, a gang condenser for example, is accurately located in a large number of equally spaced positions by means of step by step mechanism, which in conjunction with a similar mechanism at the remote control point and two associated relays maintains the distant remote control scale pointer and receiver gang condenser in step with each other and thus provides an accurate indication of any one of the number of possible positions of the gang condenser.

Fine tuning between these positions may be carried out by means of slight adjustment of the beating frequency oscillator of the associated receiver by any one of the standard methods of frequency control, e. g. by means of Miller effect, variation of oscillating tube operating potentials, transferred capacity across part of the oscillator tuned circuit, or any other convenient means.

Indication of tuning between steps is provided by arranging that the operation of the fine tuning control rotates the tuning scale slightly behind the scale pointer operated by the step by step system, thereby allowing the tuning of the receiver to be carried out normally over the whole scale by means of two controls, one main tuning control for the step by step mechanism and one for the fine tuning control.

A description will be given of one of the embodiments of the invention, reference being made for this purpose to the accompanying drawings in which:

Fig. 5 shows the circuit arrangement of the commutator control device of Fig. 4;

Fig. 6 shows the circuit pertaining to an arrangement affording spot frequency control;

Fig. 7 shows the circuit pertaining to an arrangement in which the tuning of the receiver may be carried out either at the receiver end or at the remote control end, the choice being determined at the remote control end; and Fig. 8 shows the circuit pertaining to an arrangement like that of Fig. 7 except that the choice may be determined at either end.

The step by step mechanism consists of two parts, a unit mounting on the receiver tuning condenser and a unit mounting at the remote control operating point.

Figure 1:
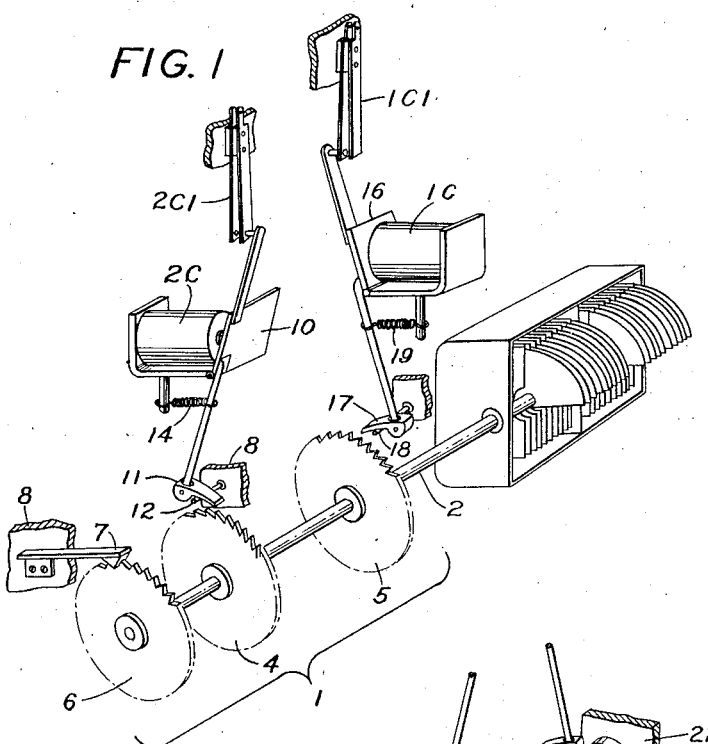
Fig. 1 shows the mechanism associated with the tuning condenser on the receiver.

*Receiver unit (Fig. 1)*

A set 1 of ratchet wheels 4, 5 and 6 is mounted directly on the shaft of the gang condenser 2; the wheel 4 has its teeth set for rotation in a clockwise direction, the wheel 5 has its teeth set for rotation in an anti-clockwise direction, and the wheel 6 has wedge-shape teeth which engage a retaining pawl 7 secured to the frame of the mechanism 8 for the purpose of locating the condenser definitely in any click position. As the ratchet wheels 1 are mounted directly on the condenser spindle 2 and the retaining pawl 7 directly engages the wedge shape location teeth 6 a very positive condenser location is obtained and bearing or link motion bearing play and resulting backlash is eliminated. The gang condenser bearings are of the normal ball race and thrust bearing type which are free from backlash.

The condenser is rotatable in a clockwise direction by means of the electromagnet 2C mounted on the mechanism main frame 8 which in turn may be mounted on the gang condenser end plate. This magnet 2C pulls up the armature 10 which in turn pushes the pawl 11 clear of the back stop pin 12 into engagement with the ratchet teeth 4. Spring set contacts 2C1 are broken at the end of the armature movement, thus giving an indication to the remote control position that one step rotation of the ratchet wheel driving the condenser has been completed. The associated control relay then causes the magnet 2C to release; the retaining pawl 7 centralises the condenser in this new position; and the armature is restored to its original position by the restoring spring 14. The driving pawl 11 at the same time is raised clear of the ratchet wheel teeth 4 by engagement with the back stop 12.

In a similar way the condenser is rotatable in an anti-clockwise direction by means of a similar set of elements namely, magnet 1C, armature 16, driving pawl 17, back stop 18, restoring spring 19, and associated contact springs 1C1.

*Remote control unit (Fig. 2)*

The remote control unit consists of a somewhat similar mechanism. A set of ratchet wheels 24 is mounted on its own bearing 21 attached to the unit frame 22, and a pointer 23 is mounted for rotation with the wheels, sweeping over a tuning scale 25 to indicate the position of the gang condenser controlled by the receiver step by step mechanism. The drive of the clockwise forward ratchet wheel is by a magnet 2R (shown in Fig. 3). This magnet is identical in every way with similar magnet 2C at the receiver, and actuates repeating contacts 2R1, also identically constructed as are contacts 2C1. Similarly, the counter-clockwise rearward ratchet wheel is driven by a magnet 1R, having repeating contacts 1R1. Since these are identical, as indicated, with the drive magnets and contacts of the receiver, shown in Fig. 1, it is considered expedient not to encumber Fig. 2 by a repetitious showing thereof in this latter figure. This scale carries an outer reference scale divided into 100 parts corresponding to the step by step positions of the gang condenser and on the remainder of the dial are marked as many ordinary calibrated receiver scales as there are ranges on the wave change switch of the associated receiver. The actual scale 25 is rotatable on its bearing bush 26 by means of a spring loaded arm 27 engaging a cam 28 mounted on a fine tuning control spindle 29.

By this means rotation of the fine tuning control 29a, which may be a normal potentiometer or variable condenser (see below), causes the scale 25 to move relative to the pointer 23 operated by the step by step mechanism; in this way actual tuning positions over any portion of a single step may be indicated on the dial.

Therefore by means of the step by step action and the slight rotation of the scale itself in either direction, via the fine tuning control, a continuously variable indication of the remote gang condenser tuning position is provided over the whole length of the tuning scale.

The two control relays are of the normal telephone type and may form a separate unit or form part of the remote control unit as required by normal installation considerations.

The step by step control key may consist of two normal telephone keys, a special 4-position key, or a special control commutating device described below, or other means designed to meet particular operating requirements.

*Method of operation*

The remote control unit described below is provided with an operating key which will cause the step by step mechanism to rotate the tuning condenser continuously in a clockwise or anti-clockwise direction approximately to the required position; the last one or two steps being carried out by one or two further positions of the key in single steps as desired by the operator, the final fine tuning being done by the fine tuning control. The fine tuning between positions is made possible by the fact that the retaining pawl of the receiver tuning condenser step by step mechanism accurately locates this condenser in definite positions.

The fine tuning may be carried out over the small range of frequency covered by a single step of the gang condenser by varying the frequency of the beating oscillator in the associated receiver by any of the standard radio circuits devices such as, Miller effect, variation of oscillating tube operating potentials, transferred capacity across part of the oscillator tuned circuit, or any other convenient circuit arrangement. The actual control may consist of either a potentiometer or variable condenser depending on the particular device used, this control being operated by the fine tuning control spindle 29 in Figure 2.

The operation of the step by step portion of the control is so arranged that a definite sequence of operations must be carried out at the two ends of the system to ensure that the dial pointer and gang condenser positions are kept in step with each other throughout their travel.

Figure 3:
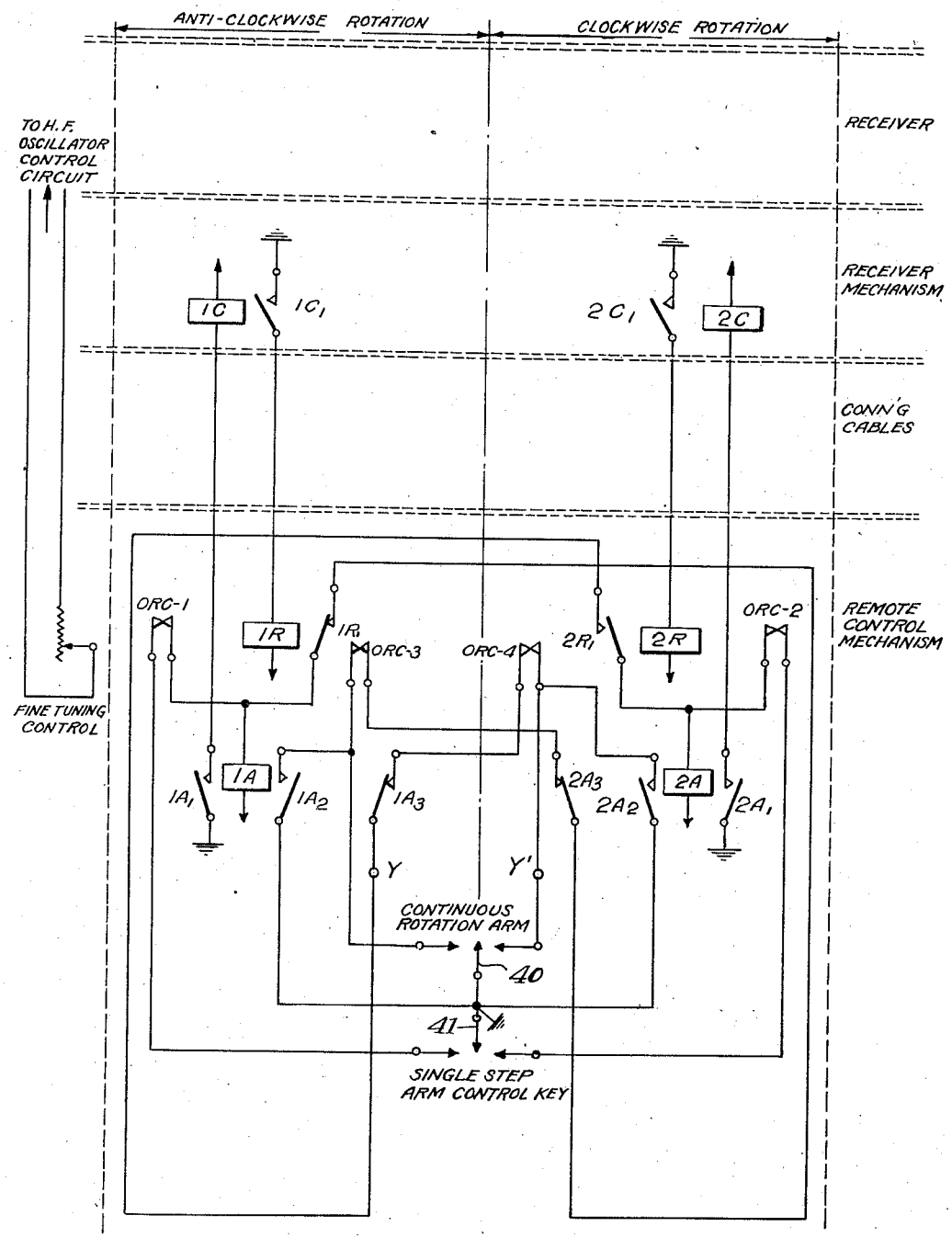
Fig. 3 shows the circuit connecting the mechanisms of Figs. 1 and 2.

The circuit is shown in Fig. 3, and its operation on continuous rotation in an anti-clockwise direction is as follows:

1. The continuous rotation arm 40 of the control key is moved to the left contact.
2. Relay 1A operates.
3. Receiver end magnet 1C operates and rotates the tuning condenser through one step.
4. At the end of the stroke of magnet 1C spring contacts 1C1 are made.
5. The remote control end magnet 1R operates and rotates the scale pointer through one step.
6. At the end of the stroke of the armature of magnet 1R, spring contacts 1R1 break.
7. This releases relay 1A which opens contacts 1A1.
8. The receiver end magnet 1C then releases, the associated retaining pawl 7 accurately centres the condenser and spring contacts 1C1 open.
9. This releases the remote control magnet 1R, its associated retaining pawl accurately centres the dial pointer in this tooth and 1R1 contacts are remade.
10. Relay 1A again operates and the sequence is repeated for the next step so that rotation of the condenser and dial pointer continue. To stop this continuous rotation the control key 40 is restored to its central position.

Contacts 1A2 of relay 1A ensure that the circuit can not be broken until operation 7 above has been completed, so that the release of the control key at any point in this sequence does not allow a partial operation to occur and result in the tuning condenser getting out of step with the scale pointer.

The overrun contacts on the remote control mechanism ensure that the gang condenser is not rotated beyond its normal travel and these break the circuit at operation 6 on the last step to ensure that the dial pointer and tuning condensers are still in step with each other.

Clockwise operation is carried out in a similar way by throwing the continuous rotation arm 40 of the control key to the right contact.

The circuit for single-step operation differs from that for continuous rotation in that the contacts 1R1 do not appear in the operating circuit of relay 1A, so that single step operation is carried out in an anti-clockwise direction as follows:

1. The control key single step arm 41 is moved to the left contact.
2. Relay 1A operates.
3. Receiver end magnet 1C operates and rotates the condenser through one step.
4. At the end of the stroke of the armature of magnet 1C, spring contacts 1C1 make.
5. The remote control end magnet 1R operates and rotates the scale pointer through one step.
6. At the end of the stroke of the armature of magnet 1R, spring contacts 1R1 break.
7. The circuit is then held in this position until the control key is manually released to allow it to spring back to its central position. Then relay 1A releases, opening contacts 1A1.
8. The receiver magnet 1C then releases, its retaining pawl 7 centres the condenser accurately in this tooth and spring contacts 1C1 re-open.

9. This releases the remote control magnet 1R and its retaining pawl centres the dial pointer accurately in this tooth and 1R1 contacts are re-made but the circuit to relay 1A is broken so the circuit remains in this, its original position.

The same safeguards against premature release of the control key are provided by contacts 1A2 as described above in connection with continuous rotation.

*Commutator control device (Figs. 4 and 5).*

Figure 4:
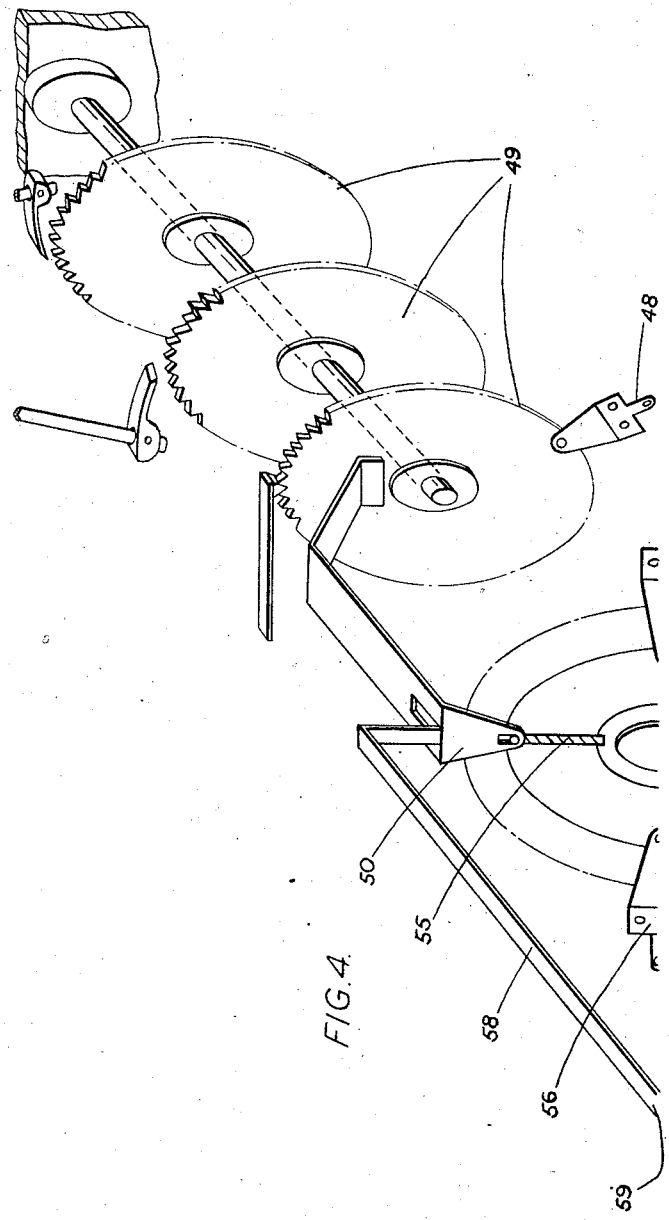
Fig. 4 shows the mechanism of a commutator control device which constitutes an alternative to what is shown in Fig. 2.

With a control system of this type many combinations of standard components may be used to provide particular operating facilities. Thus Fig. 4 shows a commutator control device which may replace the four-position control key described above.

With this arrangement the step by step mechanisms are controlled by a single knob which carries an auxiliary pointer mechanically connected to this knob. All the operator has to do is to turn this knob and pointer to the required tuning point on the scale and the step by step mechanism will start up and turn the condenser and main pointer round into step with the auxiliary pointer.

The single step operation previously described is then unnecessary.

Figure 2:
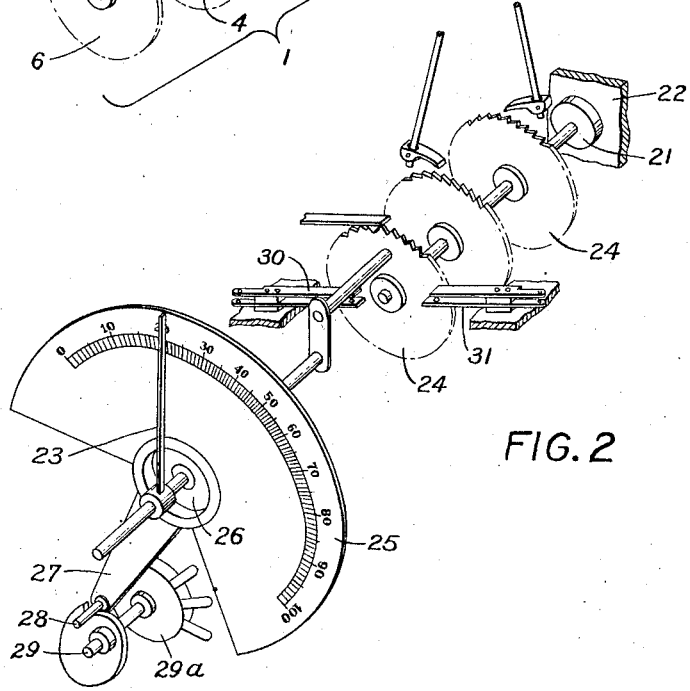
Fig. 2 shows the corresponding mechanism at the remote control operating point.

The remote control mechanism is as described with respect to Fig. 2 except that a contact 50 has been attached to the inner ratchet wheel 49 which contacts with a commutator 51 attached to the control spindle 52. This commutator consists of two semi-circular plates 53 and 54 separated by a thin insulating strip 55. Two further feeding brushes 56 and 57 complete the circuit through the commutator segments 53 and 54. The ratchet wheel 49 also carries a shaped pointer 58 which passes over the outer edge of the tuning scale 60 and which is visible from the front part of the control unit at its extreme end 59.

A slightly rotatable scale 60 is operated by a cam 61 on the fine tuning control shaft 62 as previously described. The auxiliary pointer 63 is clamped to the main control spindle 52 and when the control knob 64 is rotated the commutator 51 and auxiliary pointer 63 are carried round together.

To keep the control knob in step with the definite positions of the step by step mechanism, the knob is automatically centered to the nearest step by step mechanism by means of the spring-pressed pawl 65 engaging the detent wheel 66 which forms part of the commutator assembly 51.

The teeth of this detent wheel correspond with similar teeth forming part of the inner main ratchet wheel 49.

The operation of the step by step mechanism is as described except that the control key is replaced by this commutator device, the circuit of which is shown in Figure 5.

The normal position of the commutator is such that the brush 50 is resting on the insulating segment 55. Turning the control knob 64 to the new required position indicated by the auxiliary pointer 63, causes the commutator assembly 51 to be rotated and if this assembly is turned in a clockwise direction brush 50 will then contact with segment 54 and a circuit will be completed from earth via pick up brush 48 to the ratchet wheel brush 50 then from segment 54 and feeder brush 57 to point Y of Figure 3 which will cause the step by step mechanism to operate in this direction. The commutator assembly thus replaces the continuous rotation arm 40 of the control key.

Movement of the mechanism will then carry the brush 50 towards the new position of the insulating segment 55 and rotation of the mechanism will continue until the brush is stepped off the segment 54 and onto the insulating segment 55 on the last step of the mechanism. Further movement will be prevented as the circuit to Y will be broken. The main pointer will then have been brought into step with the auxiliary pointer originally reset by the control knob and the receiver tuning condenser will also have been brought into the corresponding position.

Fine tuning can then be carried out by operating the fine tuning control as described with respect to Figure 2.

The advantages of this commutator device are that, (1) the main tuning control is reduced to a single knob; (2) the control can be set visually to any new tuning point and the operator need not wait for the mechanism to step the condenser and main pointer round to the new tuning position.

*Spot frequency working in addition to continuous tuning (Fig. 6)*

By adding a number of fixed brushes around the commutator assembly of Figs. 4 and 5, it is possible to arrange for spot frequency working as well as continuous tuning. The spot frequency can be selected by means of individual push buttons controlling individual fine tuning controls 91, 92 and 93, particular to each spot frequency. The operator could then individually adjust the fine tuning control for each spot frequency during normal reception but at the same time pass quickly from one frequency to another which is the main advantage of the spot frequency working. Such an arrangement is shown in Figure 6. The spot frequency brushes 80, 81 and 82 are spaced around the commutator assembly 83 and the appropriate brush is selected by means of push buttons 84, 85 and 86. The circuit is completed by the appropriate commutator segment and spot frequency brush selected by the push buttons, the mechanism movement being completed when the brush selected comes to rest on the insulated segment 87.

When spot frequency tuning is in use the main pointer 59, Figure 4, would mark the spot frequency selected but would of course move away from the hand control auxiliary pointer 63. On returning to continuous tuning by release of all push button keys the selector would return to the point indicated by the auxiliary pointer.

The full operating circuit is as follows. A common earth passes through any one of the three keys 84, 85 and 86 to the appropriate spot frequency brush 80, 81, 82 which depending on the position of the commutator segments 88 and 89, passes on to one of the feeder brushes 90 which energise the selector mechanism in the normal way.

*Alternative control at either the receiver or remote control point (Fig. 7 or Fig. 8)*

By duplicating the control key or commutator control device by a similar key or device such as key 40a at the receiver end and adding a changeover key 42 at the remote control position (Fig. 7), it is possible to arrange for the tuning to be normally carried out at the receiver end but to be transferred to the remote control position by the throw of control key 42 there. The control, however, is under the control of the remote end operator and could not be picked up again by the receiver and operator.

If, however, it is desired to give equal opportunities for the receiver to be controlled from either the receiver end or the remote control point, a somewhat more complicated device, shown in Figure 8, could be used. This involves the use of two additional relays. Control of the control circuit is obtained by the operator who first operates his control key and on completing the tuning operation the tuning could be transferred to the other operator as required. The operation of this circuit is as follows.

If control key K1 is thrown when control key K2 is in open position as shown, contact K1B completes the circuit to relay D through closed contact K2A of key K2 connected to earth, which closes contact D2 to earth via the other contact K1C. The other relay contact D1 closes the circuit to Y thereby starting the normal operation of the control mechanism. Should the receiver end operator now throw his control key K2 it will be inoperative as the remote control operator's control is locked via the contact K1C to earth, keeping relay E energized and operating contact D1 closed as long as control key K1 is closed. Moreover, the closing of control key K2 under these conditions cannot energize relay E, since contact K1A is open.

Likewise, if control key K2 is thrown when key K1 is in open position as shown, relay E will be energized through contacts K2B and K1A, closing a locking circuit to earth through contacts E2 and K2C which is not affected by operation of key K1. Such operation will be ineffective until control key K2 is opened since contact K2A is open.

This circuit therefore renders one control inoperative when the other control has been operated and at the same time prevents operation of the second control interfering with the operation of the initial control. When, however, either key is released the other key can be operated and can take control of tuning.

CONCLUSION

The basic principle of this control system is the combination of the high mechanical accuracy of a step by step system over a large number of points throughout the tuning range of a receiver with the flexibility of an electrical frequency control system over each portion of the tuning range covered by an individual step of the step by step system.

*Advantages*

Advantages of this system are as follows:
1. The link between the receiver and remote control point is entirely electrical thereby eliminating all the difficulties associated with mechanical control cables such as, (a) backlash, (b) excessive friction, (c) installation difficulties due to large radius and limited number of bends allowable, (d) limited range of control cable.
2. Positive indications of the gang condenser position are provided at the control end.
3. The electrical step by step circuit is so arranged that the receiver and remote control components operate in series in a definite sequence so that one end of the control cannot be out of step with the other due to any differences in the speed of operation of the component parts.

4. The gang condenser is accurately positioned by a spring-pressed V-shaped pawl engaging V-shaped teeth cut on a wheel mounted directly on the condenser spindle, thereby eliminating backlash in the locating position, making it independent of the adjustment of the operating magnets and automatically taking up the effects of wear on the wheel which may occur during its normal life.

5. By means of the commutator control device the auxiliary pointer can be immediately set to the position required to tune the receiver and the step by step mechanism will follow round and take up this position.

6. By adding further contacts to the control commutator assembly a push button device can be used to set the receiver tuning to any number of spot frequencies depending on the number of contact springs fitted.

7. Further by increasing the number of fine tuning control potentiometers or variable condensers which may be selected by the push buttons referred to above, individual fine tuning for each spot frequency may be provided, thereby following any drift of the ground transmitter; and after such adjustment any spot frequency may be selected by merely operating the selector button.

8. This device will further provide remote control spot frequency working together with continuously variable remote control tuning, which is not usually covered by the same apparatus.

9. By duplicating the control key or commutator control and by adding control changeover keys the tuning control may be transferred to an emergency operator or else arranged to be equally controllable by either one of two operators.

What is claimed is:

1. A remote control system for radio tuning apparatus comprising tuning means, means actuated by successive electrical impulses for adjusting the apparatus by successive steps, means operated from a remote control station for transmitting an actuating impulse to the tuning means, means responsive to the reception of said impulse for transmitting a return impulse to the control station, and means at the control station actuated by the return impulse for transmitting a successive actuating impulse to the tuning means, arranged to provide a continuing cycle of successive tuning steps, and means at the control station for starting and terminating said cycle, also including contact making means operated at the control station for transmitting only a single impulse to the tuning means for each contact made and held for any length of time.

2. A remote control system for radio tuning apparatus comprising tuning means, means including step mechanism for adjusting the apparatus, a tuning indicator device at a remote control station, step mechanism for operating the indicator device, and an electrical system for synchronized operation of the tuning means and indicating device comprising means for setting both mechanisms for actuation, and means responsive to said setting of both mechanisms for actuating both mechanisms, said setting means including means for initially setting the tuning mechanism and means responsive to said setting for thereafter setting the indicator device operating mechanism, and in which said mechanisms are simultaneously actuated.

3. A remote control system for radio tuning apparatus comprising a remote control station, means for adjusting said apparatus including a spring actuated ratchet, a relay and means for setting the ratchet when the relay is energized; means operated from a remote control station for energizing said relay; a tuning indicator at the remote control station; means for setting the tuning indicator to indicate the setting of said apparatus including a spring actuated ratchet and electro-magnetic means for setting the latter ratchet; means operated from the control station for energizing the relay, means actuated by the energizing of the relay for energizing the electro-magnetic means, and means actuated by the energizing of the electro-magnetic means for deenergizing the latter means and said relay and releasing the setting of said ratchets to permit spring actuation, said electromagnetic means including an armature switch in circuit with the operating relay, arranged to open said circuit when the electromagnetic means is energized.

4. In a remote control system for tuning a radio receiver a remote control point, a tuning portion of said receiver, mechanism for adjusting said tuning portion, means for operating said mechanism step-wise, a tuning indicator located at the remote control point, including a scale and an associated pointer movable relative to each other, a step mechanism and means for moving said indicator by said step mechanism, means for moving said pointer step-wise, actuated by said indicator step mechanism and means for providing inter-step tuning of said receiver and corresponding inter-step adjustment of said indicator, said last means comprising an electrical vernier tuning device and means for adjusting said inter-step indicator in accordance with the setting of the vernier tuning device, said adjusting means including means for moving said scale relative to the pointer actuated by said vernier device.

5. A remote control system for radio tuning apparatus, including mechanism for adjusting the apparatus step by step, a remote control station, a tuning indicator at said remote control station, means for actuating said indicator in synchronism with the adjusting of said apparatus, means controlled from said apparatus for actuating said mechanism, means controlled from the control station for actuating said mechanism and means operated from one of said controlled means for placing the other controlled means in and out of operation.

6. A remote control system for radio tuning apparatus, including mechanism for adjusting the apparatus step by step, a remote control station, a tuning indicator at said remote control station, means for actuating said indicator in synchronism with the adjusting of said apparatus, means controlled from said apparatus for actuating said mechanism, means controlled from the control station for actuating said mechanism, and means associated with each of said controlled means for placing said controlled means in operation and for throwing the other controlled means out of operation.

GEOFFREY NEWTON.

REFERENCES CITED

The following references are of record in the file of this patent:

UNITED STATES PATENTS

| Number | Name | Date |
|---|---|---|
| 1,778,077 | Holden | Oct. 14, 1930 |
| 1,655,160 | Powell | Jan. 3, 1928 |
| 2,111,413 | Will et al. | Mar. 15, 1938 |
| 1,992,599 | Bellamy | Feb. 26, 1935 |
| 1,700,281 | Burns et al. | Jan. 29, 1929 |
| 1,968,302 | Maurer | July 31, 1934 |
| 1,832,474 | Bludworth et al. | Nov. 17, 1931 |
| 1,782,907 | Nielsen | Nov. 25, 1930 |
| 1,488,723 | Welsh | Apr. 1, 1924 |
| 880,136 | Gehrung | Feb. 2, 1907 |
| 2,078,060 | Clement | Apr. 20, 1937 |
| 1,880,693 | Bertomeu | Oct. 4, 1932 |
| 2,064,904 | Green | Dec. 22, 1936 |
| 2,085,442 | Newell | June 29, 1937 |
| 1,930,159 | Crilly | Oct. 10, 1933 |
| 1,992,326 | Powell | Feb. 26, 1935 |
| 1,841,283 | Fleig | Jan. 12, 1932 |
| 2,330,818 | Emde | Oct. 5, 1943 |

FOREIGN PATENTS

| Number | Country | Date |
|---|---|---|
| 441,851 | Great Britain | Jan. 20, 1936 |
| 501,370 | Great Britain | Feb. 27, 1939 |
| 351,934 | Great Britain | June 19, 1931 |
| 783,196 | France | July 9, 1935 |
| 416,775 | Great Britain | Sept. 14, 1934 |